United States Patent
Lee et al.

(10) Patent No.: US 6,721,401 B2
(45) Date of Patent: Apr. 13, 2004

(54) METHOD FOR REDIRECTING A CALLING PHONE FROM A FINDER SERVICE TO A DESTINATION PHONE

(76) Inventors: Anne Yin-Fee Lee, 417 Menominee La., Naperville, IL (US) 60563; Ronald Bruce Martin, 1N275 Papworth St., Carol Stream, IL (US) 60188

( * ) Notice: Subject to any disclaimer, the term of this patent is extended or adjusted under 35 U.S.C. 154(b) by 142 days.

(21) Appl. No.: 10/041,564

(22) Filed: Jan. 10, 2002

(65) Prior Publication Data

US 2003/0128823 A1 Jul. 10, 2003

(51) Int. Cl.[7] .............................................. H04M 11/00
(52) U.S. Cl. ............................. 379/93.17; 379/218.01; 379/90.01; 370/352
(58) Field of Search ...................... 379/93.17, 93.19, 379/93.23, 93.25, 218.01; 370/352

(56) References Cited

U.S. PATENT DOCUMENTS

| | | | |
|---|---|---|---|
| 5,850,433 A | * | 12/1998 | Rondeau ..................... 379/201 |
| 6,052,439 A | * | 4/2000 | Berszberg et al. .......... 379/216 |
| 6,249,576 B1 | * | 6/2001 | Sassin et al. ............. 379/93.23 |
| 6,404,877 B1 | * | 6/2002 | Bolduc et al. ......... 379/218.01 |
| 2001/0018703 A1 | * | 8/2001 | Miyazawa et al. .......... 709/203 |
| 2001/0024444 A1 | * | 9/2001 | Asai ........................... 370/352 |
| 2002/0143856 A1 | * | 10/2002 | Sastri et al. ................ 709/202 |

* cited by examiner

Primary Examiner—Stella Woo
(74) Attorney, Agent, or Firm—John B. MacIntyre

(57) ABSTRACT

The present invention provides a method for redirecting a calling phone from a finder service to a destination phone. A communication system receives a request to generate a set of destination names at the finder service from the calling phone. If the calling phone is capable of processing IP data, the communication system sends a text-based menu interface including the set of destination names to the calling phone. The calling phone may send a menu response indicating one of the set of destination names to the communication system. The communication system receives the menu response from the calling phone and redirects the calling phone to the destination name.

19 Claims, 2 Drawing Sheets

METHOD FOR REDIRECTING A CALLING PHONE FROM A FINDER SERVICE TO A DESTINATION PHONE

FIELD OF THE INVENTION

The present invention relates generally to communication systems, and more particularly to a finder service in a communication system.

BACKGROUND OF THE INVENTION

In current communication systems, a calling phone can dial directory assistance to receive the phone number of a particular home or business. The user then makes a note of the phone number, hangs up, and dials the phone number to be connected with the home or business. Callers to such directory assistance providers can alternately be directly connected to the home or business without having to remember the phone number, hang up, and then dial the remembered phone number.

One limitation of such directory assistance providers is that the caller has to know the name of the person or business in order to receive the telephone number associated with the home or business.

In certain computer-based applications, a user of the computer can enter a location and a category and receive a list of names, addresses, and phone numbers for businesses near that location that fall into the category specified. For example, a user could type in a city name for the location and a restaurant type for the category and receive a listing of all restaurants located in that city that are that type of restaurant.

However, there is currently no way to generate a list of destination names for a phone to choose from and be redirected to a chosen one of the list of directory names. Therefore, a need exists for a communication system that allows a user to obtain a list of destination names and be redirected to one member of the list of destination names without having to hang up and dial directly the chosen member of the list of destination names.

BRIEF SUMMARY OF THE INVENTION

The present invention provides a method for redirecting a calling phone from a finder service to a destination phone. A communication system receives a request at the finder service from the calling phone. The request is a request to generate a set of destination names. The communication system determines if the calling phone is capable of processing IP data. If the calling phone is capable of processing IP data, the communication system sends a text-based menu interface to the calling phone. The text-based menu interface includes the set of destination names.

The calling phone can also send a menu response to the communication system. The menu response indicates one of the set of destination names. The communication system receives the menu response from the calling phone and redirects the calling phone to the destination name.

DETAILED DESCRIPTION OF THE INVENTION

Figure 1:
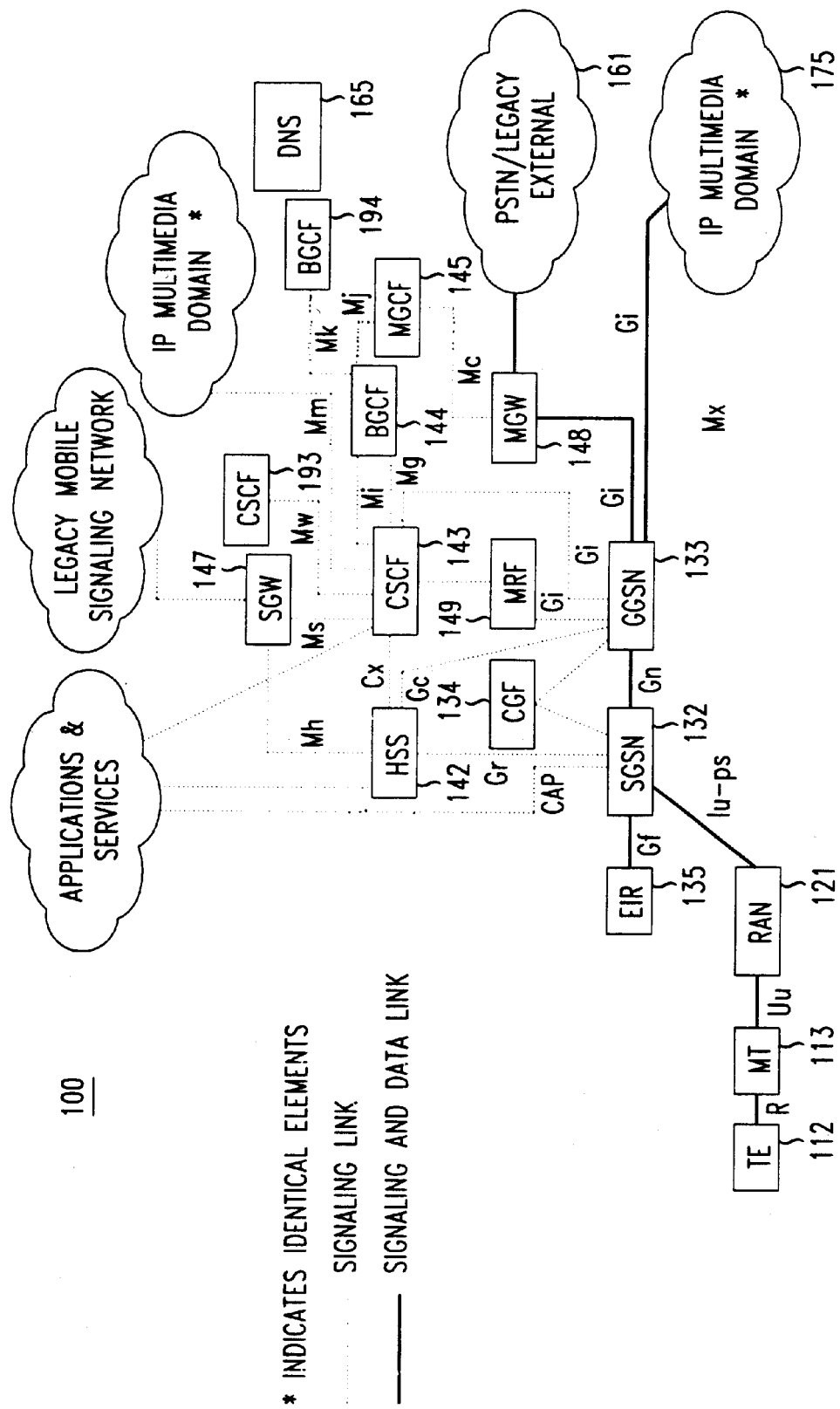
FIG. 1 depicts a communication system in accordance with the present invention.
Figure 2:
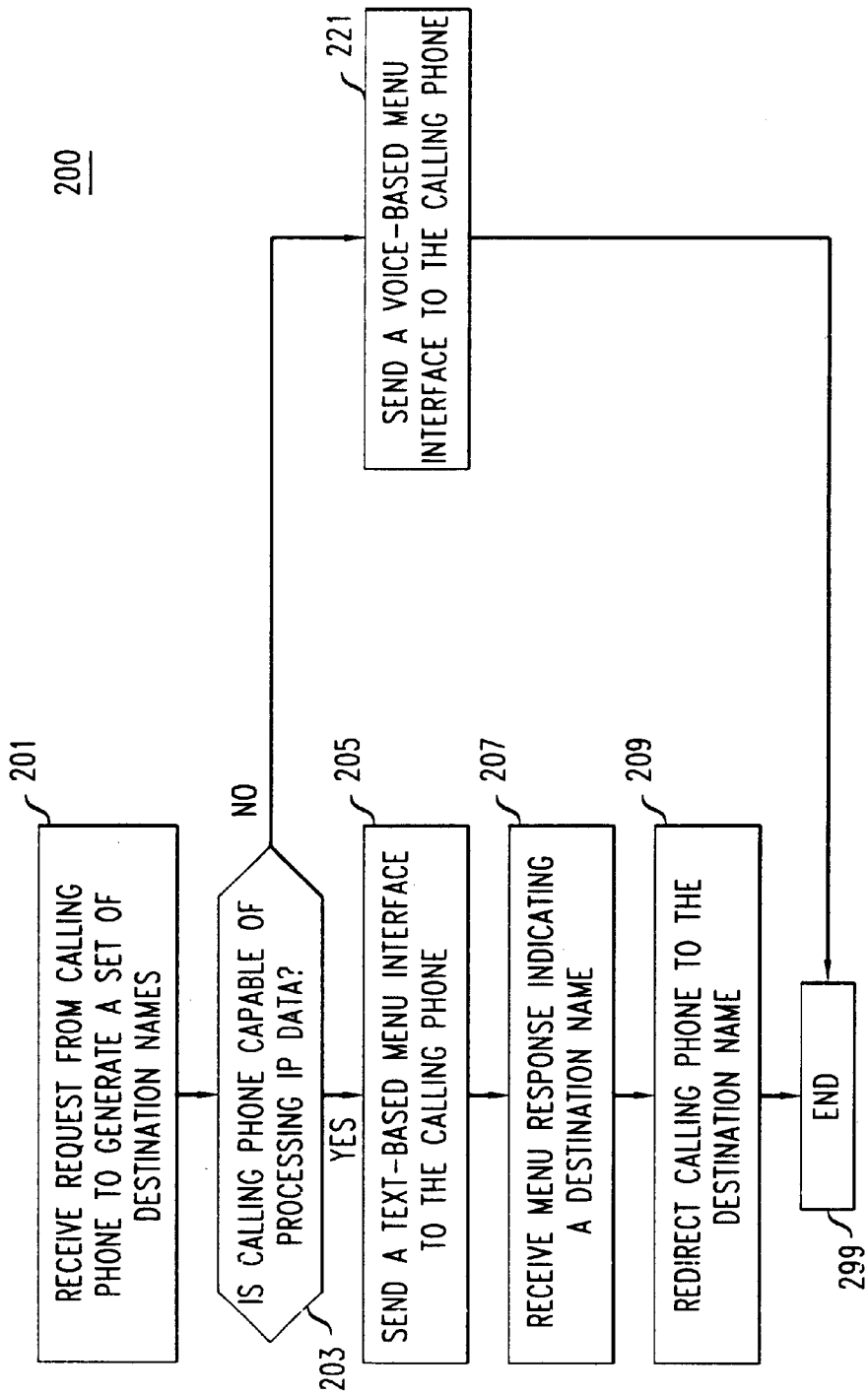
FIG. 2 depicts a flow chart of a method for redirecting a calling phone from a finder service to a destination phone in accordance with the present invention.

The present invention can be better understood with reference to FIGS. 1 and 2. FIG. 1 depicts a communication system 100 in accordance with the present invention. In an exemplary embodiment depicted in FIG. 1, communication system 100 is a Third Generation (3G) wireless system. Communication system 100 can alternately be any digital cellular system. 3G wireless systems include multiple air interface standards, including cdma2000, Universal Mobile Telecommunications System (UMTS), Wideband CDMA (W-CDMA), Global System for Mobile Communications (GSM), and UWC-136, a TDMA-based technology.

As depicted in FIG. 1, communication system 100 depicts a 3GPP reference architecture of a UMTS wireless network. It should be understood that communication system 100 can alternately be other reference architectures. Communication system 100 includes logical elements that have been defined based on network functions that have been grouped together to form each logical element. Actual implementation may contain multiple copies of these logical elements within multiple networks, and can merge any of these logical elements into single hardware entities. The architecture of the present invention is designed to utilize emerging Internet standards and protocols. An example of this is the use of Session Initiation Protocol (SIP) for IP Multimedia Subsystem (IMS) signaling for establishing a call. Use of emerging internet-based protocols, such as IPv6, allows for the IMS to provide internet-like functionality and services to mobile units along with voice and data services.

Communication system 100 includes a plurality of logical elements, comprising Terminal Equipment (TE) 112, a Mobile Termination (MT) 113, Radio Access Network (RAN) 121, packet-switched domain 131, IP Multimedia Subsystem (IMS) 141, Charging Gateway Function (CGF) 134, EIR 135, and signaling gateway (SGW) 147.

Both the UMTS-based and GSM/EDGE-based Radio Access Networks are show in this figure. Charging Gateway Functionality (CGF) 134 is now part of the base 3GPP communication system 100 to show the collection of billing information in packet-switched domain 131. As depicted in FIG. 1, Radio Access Network (RAN) and packet-switched domain 131 are independent of IMS 141.

User equipment can be any device or combination of devices that can be used to connect with a wireless network. User Equipment, for example, can be comprised of Terminal Equipment (TE) 112 and a Mobile Termination (MT) 113. User equipment is preferably a 3G mobile unit that communicates with communication system 100 via an air interface supported by communication system 100.

RAN 121 is preferably a UMTS Terrestrial Radio Access Network (UTRAN), which is the primary interface between the wireless device and the UMTS access network. Alternately, RAN 121 can be a GSM/EDGE Radio Access Network (GERAN), which is the primary interface between the wireless device and the GSM/EDGE access network. RAN 121 is coupled to user equipment via an air interface, such as a 3G air interface.

Packet-switched domain 131 includes Serving GPRS Support Node (SGSN) 132 and GPRS Gateway Support Node (GGSN) 133. SGSN 132 provides packet mobility management, authentication, session management, accounting, mapping of IP addresses to user equipment identification, such as IMSI, maintenance of mobile state information, and interfacing with GGSN 133. GGSN 133 provides interworking between the SGSNs and external packet data networks using IP.

IMS 141 preferably includes Call State Control Function (CSCF) 143, Breakout Gateway Control Function (BGCF) 144, Media Gateway Control Function (MGCF) 145, Media Gateway (MGW) 148, and Multimedia Resource Function (MRF) 149.

CSCF 143 is a signaling entity for bearer/session control. CSCF 143 manages SIP sessions, provides features/services and coordinates with other network elements for session control, feature/service control and resource allocation.

CSCF 143 performs multiple functions, which in an exemplary embodiment include incoming call gateway, call control function, serving profile database, and address handling. In addition, in accordance with an exemplary embodiment of the present invention, CSCF 143 performs GMSC Emulation as necessary to support call delivery to IMS-homed subscribers being served by a remote MSC server.

CSCF 143 has interfaces with many network elements, preferably as defined by the Third Generation Partnership Project standards, in standards document 3GPP TS 23.002. CSCF 143 is preferably connected to a plurality of elements using the SIP protocol. These network elements include GGSN 133 via interface Gi, MT 113 using interface Gm (not shown), MGCF 145 using interface Mg, BGCF 144 using interface Mi, MRF 149 using interface Mr, IP Multimedia Domain 175 (not shown), and other CSCFs, such as CSCF 193, using interfaces Mw. CSCF 143 is coupled with HSS 142 via interface Cx, preferably using the DIAMETER protocol. CSCF 143 is coupled to SGW 147 via interface Ms, which preferably uses a MAP protocol, but can alternately use a CAP or other SS7 application protocol.

BGCF 144 is a signaling entity for bearer/session control. The primary responsibility of BGCF 144 is to select the network to use for inter-working with PSTN 161 for a call from MT 113 to a PSTN address. BGCF 144 preferably performs additional functions, which include but are not limited to selection of the appropriate MGCF, hiding of network information from other networks, and provision of security through authorization of peer network elements.

BGCF 144 communicates with CSCF 143 via Mi interface, with MGCF 145 via Mj interface, and with BGCF 194 via Mk interface. These interfaces are defined in 3GPP TS 23.002. SIP is the preferred protocol for these standard interfaces. BGCF 144 may also have interfaces with other entities (not shown) to assist in making decisions within communication system 100.

BGCF 144 is preferably a logical entity from the 3GPP reference model. The actual implementation of BGCF 144 may be combined on the same platform with other logical entities that perform signaling functions such as CSCF 143, MGCF 145, and SGW 147.

To select a PSTN gateway, BGCF 144 in the home network receives the call origination message, which is an exemplary embodiment is a SIP INVITE message, from CSCF 143. The receipt of a call origination message from CSCF 143 indicates that the destination is a PSTN address. BGCF 144 needs to determine which network should be used to provide inter-working with PSTN 161. BGCF 144 may use data from multiple sources to make this determination. Examples of factors which BGCF 144 may look at in making this determination include, but are not limited to, the current location of the calling UE, the location of the PSTN address, local policies and business agreements between the visited and home networks, the desire to minimize path distance within the PSTN network, and a desire for the least-cost path. If the PSTN gateway is decided to be the home network, an MGCF within the home network, such as MGCF 145, will be selected. If the PSTN gateway is decided to be at another network, the BGCF address for the other network must be determined so that the processing may be forwarded to that network.

BGCF 144 may also provide information hiding functionality. When two BGCFs are used across a network boundary, then the BGCFs may be used to hide local network information from the other network. BGCF 144 can also provide security in communication system 100. BGCF 144 provides security by performing authorization of peer network elements for peer-to-peer SIP application level communication.

MGCF 145 terminates signaling and provides the call control interface and translations between IMS 141 and PSTN 161. MGCF 145 also provides connection control for the media channels in MGW 148. MGCF 145 communicates with MGW 148 via the Mc interface, with BGCF 144 via the Mj interface, and with CSCF 143 via the Mg interface.

MGCF 145 also preferably provides signaling to control a set of Media Gateways (MGW), such as MGW 148. This signaling is preferably in the form of H.248. With H.248, MGCF 145 is able to control establishment of bearer resources for sessions that require inter-working for bearer between PSTN 161 and IMS 141. For calls that require the services of a network operator's MGW, ports are allocated via requests from MGCF 145 within that network operator's network.

Signaling allows MGCF 145 to perform multiple operations with respect to MGW 148. These operations include MGW registration, bearer establishment control between IMS 141 and PSTN 161, request for allocation of media translation resources (i.e. compression, echo cancellation, vocoding, etc.), control of events detected at MGW 148, application of signals such as tones and announcements by MGW 148, and collection of statistics.

MGCF 145 preferably controls multiple MGWs. To be placed into service, the MGWs register themselves with their default MGCF. After registration with an MGCF, MGWs can begin bearer processing.

MGCF 145 preferably implements a SIP-based interface to CSCF 143. BGCF 144 may be in the signaling path between CSCF 143 and MGCF 145. Using this interface, MGCF 145 accepts commands from CSCF 143 to perform functions related to the control of a call.

MGW 148 is the element that translates between a media flow, such as voice, on a given IP network and bearer data on PSTN 161. MGW 148 terminates circuit-switched bearer traffic from PSTN 161 and terminates IP media flow as packet streams through GGSN 133 or MGW 173, eventually reaching the user equipment. MGW 148 preferably performs vocoding and may also provide tones and announcements. If in-band signaling methods are supported at MGW 148, then for PSTN traffic using in-band signaling, MGW 148 preferably terminates both bearer and signaling traffic, and forwards the signaling messages to MGCF 145. MGW 148 interfaces with GGSN 133 via the Gi interface and with MGCF 145 via the Mc interface.

MGW 148 may include resources to modify a bearer stream. These resources allow MGW 148 to perform encoding, compression, echo cancellation, packetization, transcoding, packet timing synchronization, and packet loss handling.

MGW 148 preferably supports multiple types of voice encoding. These include, but are not limited to, G.711, Adaptive Multi-Rate (AMR), and other G.7xx encoding schemes. MGW 148 is preferably able to use G.711 to encode and decode voice on trunks connected to a PSTN network.

MGW 148 preferably organizes bearer connections using H.248 contexts containing terminations. MGW 148 may include numerous simultaneous contexts.

MGW 148 also preferably includes resources to support a plurality of signaling mechanisms, including but not limited to registration with MGCF 145, detection of events (e.g. Dual-Tone Multi-Frequency (DTMF) detection), application of tones and announcements to bearer streams, graceful teardown and random restart, notification, generation of statistics, and support of H.248 packages.

MRF 149 provides packet-based media services, such as advanced announcement generation and detection, N-way conferencing, tone and announcement generation, and future advanced media services, such as video mixing. MRF 149 also preferably provides transcoding and interactive voice response. MRF 149 interfaces with CSCF 143 via the Mr interface, with IP Multimedia Domain 175 (not shown), and with GGSN 133 via the Gi interface.

In an exemplary embodiment, MRF 149 comprises two parts, a controller part and a bearer part. CSCF 143 preferably interfaces with the MRF controller part to request media services using SIP. The controller part preferably communicates with the bearer part via H.248. The bearer part preferably supports RTP/UDP/IP. Some of the resources maintained by MRF 149 include vocoders, transcoders, compression entities, bearer-stream mixers, echo cancellors, and other DSP resources. Vocoders are needed at MRF 149 for transcoding and mixing of multimedia streams.

HSS 142 provides support for subscriber authentication, subscriber profile management, service authorization, subscriber location management, intersystem handover, and call routing. HSS 142 provides these functions for users receiving service from circuit-switched domain 151, packet-switched domain 131, and IMS 141.

HSS 142 preferably maintains a subscriber database that includes information including, but not limited to, the identity of the subscriber, services and associated policies, location, and authentication data.

HSS 142 supports the following interfaces. Interface Cx is the interface to CSCF 143. The preferred protocol for this interface is DIAMETER. Interface Mh is the interface to SGW 147. Interface Gr is the interface to SGSN 132. Interface Gc is the interface to GGSN 133. Interface C is the interface to GMSC server 153. Interfaces Mh, Gr, Gc, D and C preferably utilize a MAP protocol.

In accordance with an exemplary embodiment of the present invention, HSS 142 recognizes when features and services are to be implemented for a subscriber at either MSC server 152 or IMS 141. In addition, HSS 142 supports procedures for IMS-homed mobile units being served at a remote MSC Server.

SGW 147 terminates transport protocols for signaling between PS domain 113 and IMS 141. The services of SGW 147 are preferably used to ensure transport interworking between the SS7 and the IP transport of signaling on its various interfaces (not all shown). SGW 147 communicates with CSCF 143 and HSS 142 via the Ms and Mh interfaces, respectively.

SGW 147 provides for HSS Subscriber roaming into circuit-switched wireless networks and transport of circuit-switched signaling over IP, such as TCP/IP.

It should be understood that a finder service can be located within communication system 100. The finder service is preferably a separate entity, but can alternately be incorporated into various pieces of communication system 100.

FIG. 2 depicts a flow chart 200 of a method for redirecting a calling phone from a finder service to a destination phone in accordance with the present invention. The processes depicted in FIG. 2 can be performed at different entities within communication system 100. The communication system receives (201) a request from a calling phone to generate a set of destination names. The request is preferably on a first connection. In one embodiment of the present invention, the request includes an indicator that the calling phone is capable of processing a text-based menu interface. The first connection can be a HyperText Markup Language (HTML) connection between the calling phone and the finder service, or can alternately be a Wireless Application Protocol (WAP) connection between the calling phone and the finder service.

The calling phone is capable of processing a text-based menu interface when the calling phone is capable of sending and receiving data. Data can be sent and received using, for example, the Internet Protocol (IP). The calling phone can be a wireline phone, a wireless phone, a softphone running on a computer, a Personal Digital Assistant (PDA), a pen tablet, a web pad, or any other phone that is capable of processing IP data.

The request for destination names could be, for example, a request for a particular type of restaurant within a city or its surrounding area. The request for destination could also include numerous other requests, including but not limited to types of facilities within a geographic area, such as restaurants, gas stations, automatic teller machines, shops, department stores, and other similar entities. The request can be geographically-based, theme-based, or a combination of the two. For example, the request could be for all businesses near a particular intersection, which would be a geographically-based request. The request could also be for all automatic teller machines in a city, which would be a theme-based request. Alternately, a combination request could occur where a user requests all restaurants located near a particular location.

The communication system determines (203) if the calling phone is capable of processing IP data. In one embodiment of the present invention, the communication system determines if the calling phone is capable of processing IP data by checking the indicator. If the indicator includes information that the calling phone is capable of sending and receiving IP data, the communication system will proceed to step 205.

In a further embodiment of the present invention, the communication system determines if the calling phone is capable of processing IP data by determining if the calling phone can process HTML (HyperText Markup Language) messages. In still a further embodiment of the present invention, the communication system determines if the calling phone is capable of processing IP data by determining if the calling phone can process Wireless Application Protocol (WAP) messages.

If the calling phone is not capable of processing IP data as determined at step 203, the communication system sends (221) a voice-based menu interface to the calling phone. The voice-based menu interface is preferably a list of destination names that each have an associated phone number. For example, the communication system may transmit a list of the names of the restaurants located within the requested city. If the user presses a key on the calling phone, the communication system preferably sends, via a voice-based message, the phone number of the chosen menu selection. The user of the phone then preferably records or remembers the phone number, ends the current call, and initiates a new call to the chosen location by entering the directory number of the chosen menu selection.

If the calling phone is capable of processing IP data as determined at step 203, the communication system sends (205) a text-based menu interface to the calling phone. The text-based menu interface is preferably a plurality of data packets that includes a set of destination names. In a first embodiment, the text-based menu interface is sent by sending an HTML (HyperText Markup Language) message. In a second embodiment, the text-based menu interface is sent by sending a Wireless Application Protocol (WAP) message.

The set of destination names includes information related to the request made by the calling phone. This information may include, but is not limited to names, phone numbers, addresses, cities, and business type.

The calling phone can choose one of the set of destination names. This choice can be made by various means, such as by clicking on an HTML link. The choice indicates one of the set of destination names and is added to a menu response message sent from the calling phone to the communication system.

The communication system receives (207) the menu response from the calling phone. The menu response preferably indicates a directory number of a destination phone.

The communication system redirects (209) the calling phone to the destination name. In one embodiment of the present invention, the redirection is initiated on a second connection between the calling phone and a phone associated with the destination name. The second connection may have a different Quality of Service (QoS) than the first connection. The QoS should be sufficient to support the type of call that is to be carried on the second connection. For example, the first connection has a QoS that is sufficient to support the request from the calling phone. This is typically a data call having a low QoS. QoS is higher for the second connection than the first connection where the second connection supports voice, streaming audio, streaming video, or other higher bandwidth services.

The present invention thereby provides a method for redirecting a calling phone from a finder service to a destination phone. The present invention allows a list of destination names to be generated for a phone to choose from. The phone can be redirected to a chosen one of the list of directory names. The present invention allows a user to obtain a list of destination names and be redirected to one member of the list of destination names without having to hang up and dial directly the chosen member of the list of destination names.

While this invention has been described in terms of certain examples thereof, it is not intended that it be limited to the above description, but rather only to the extent set forth in the claims that follow.

We claim:

1. A method for redirecting a calling phone from a finder service to a destination phone, the method comprising:
   receiving a request at the finder service from the calling phone, the request being a request to generate a set of destination names;
   determining if the calling phone is capable of processing IP data;
   if the calling phone is capable of processing IP data, sending a text-based menu interface to the calling phone, the text-based menu interface including the set of destination names;
   receiving a menu response from the calling phone, the menu response indicating one of the set of destination names; and
   redirecting the calling phone to the destination name.

2. A method for redirecting a calling phone from a finder service to a destination phone in accordance with claim 1, wherein the request includes an indicator that the calling phone is capable of processing a text-based menu interface.

3. A method for redirecting a calling phone from a finder service to a destination phone in accordance with claim 2, wherein the step of determining if the calling phone is capable of processing IP data comprises checking the indicator.

4. A method for redirecting a calling phone from a finder service to a destination phone in accordance with claim 1, wherein the step of determining if the calling phone is capable of processing IP data comprises determining if the calling phone can process HTML (HyperText Markup Language) messages.

5. A method for redirecting a calling phone from a finder service to a destination phone in accordance with claim 1, wherein the step of determining if the calling phone is capable of processing IP data comprises determining if the calling phone can process Wireless Application Protocol (WAP) messages.

6. A method for redirecting a calling phone from a finder service to a destination phone in accordance with claim 1, wherein the step of sending a text-based menu interface comprises sending an HTML (HyperText Markup Language) message.

7. A method for redirecting a calling phone from a finder service to a destination phone in accordance with claim 1, wherein the step of sending a text-based menu interface comprises sending a Wireless Application Protocol (WAP) message.

8. A method for redirecting a calling phone from a finder service to a destination phone in accordance with claim 1, wherein the calling phone is a wireline phone.

9. A method for redirecting a calling phone from a finder service to a destination phone in accordance with claim 1, wherein the calling phone is a softphone running on a computer.

10. A method for redirecting a calling phone from a finder service to a destination phone in accordance with claim 1, wherein the calling phone is a wireless phone.

11. A method for redirecting a calling phone from a finder service to a destination phone in accordance with claim 1, wherein the calling phone is a Personal Digital Assistant (PDA).

12. A method for redirecting a calling phone from a finder service to a destination phone in accordance with claim 1, wherein the calling phone is a pen tablet.

13. A method for redirecting a calling phone from a finder service to a destination phone in accordance with claim 1, wherein the calling phone is a web pad.

14. A method for redirecting a calling phone from a finder service to a destination phone in accordance with claim 1, wherein the request utilizes a first connection, wherein the step of redirecting the calling phone to the destination name comprises initiating a second connection between the calling phone and the destination name.

15. A method for redirecting a calling phone from a finder service to a destination phone in accordance with claim 11, wherein the step of initiating a second connection between the calling phone and the destination name comprises initiating a second connection between the calling phone and the destination name having a different Quality of Service (QoS) than the first connection.

16. A method for redirecting a calling phone from a finder service to a destination phone in accordance with claim 15, wherein the QoS is higher for the second connection than the first connection.

17. A method for redirecting a calling phone from a finder service to a destination phone in accordance with claim 15, wherein the QoS for the second connection is sufficient to support voice.

18. A method for transferring a call session from a HyperText Markup Language (HTML) to a voice session, the method comprising:

- establishing an HTML connection between a calling phone and a finder service;
- sending a text-based menu interface to the calling phone;
- receiving a menu response from the calling phone, the menu response indicating a directory number of a destination phone; and
- transferring the call session to a voice session between the calling phone and the destination phone.

19. A method for transferring a call session from a Wireless Application Protocol (WAP) session to a voice session, the method comprising:

- establishing a WAP connection between a calling phone and a finder service;
- sending a text-based menu interface to the calling phone;
- receiving a menu response from the calling phone, the menu response indicating a directory number of a destination phone; and
- transferring the call session to a voice session between the calling phone and the destination phone.

* * * * *

UNITED STATES PATENT AND TRADEMARK OFFICE
CERTIFICATE OF CORRECTION

PATENT NO. : 6,721,401 B2
DATED : April 13, 2004
INVENTOR(S) : Anne Yin-Fee Lee and Ronald Bruce Martin It is certified that error appears in the above-identified patent and that said Letters Patent is hereby corrected as shown below:

<u>Title page,</u>
Add Item:
-- [73] Assignee: Lucent Technologies Inc.,
  Murray Hill, N.J. --

Signed and Sealed this

Eighteenth Day of January, 2005

JON W. DUDAS
*Director of the United States Patent and Trademark Office*